United States Patent
Karlsson et al.

(10) Patent No.: US 8,331,392 B2
(45) Date of Patent: Dec. 11, 2012

(54) METHOD AND DEVICE FOR ALLOCATION OF TRANSMISSION RATE IN A RADIO TELECOMMUNICATION NETWORK

(75) Inventors: Patrik Karlsson, Älta (SE); Joe Constantine, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 744 days.

(21) Appl. No.: 12/300,668

(22) PCT Filed: May 17, 2006

(86) PCT No.: PCT/SE2006/050134
§ 371 (c)(1), (2), (4) Date: Nov. 13, 2008

(87) PCT Pub. No.: WO2007/133137
PCT Pub. Date: Nov. 22, 2007

(65) Prior Publication Data
US 2009/0238125 A1  Sep. 24, 2009

(51) Int. Cl.
*H04L 12/54* (2006.01)
(52) U.S. Cl. .................................................. 370/429
(58) Field of Classification Search .......... 370/235, 370/236–236.2, 310, 328, 329, 351, 389, 370/229–232, 241, 252–253, 412–413, 428–429, 370/431, 433, 437, 462, 464–465, 912–914
See application file for complete search history.

(56) References Cited

U.S. PATENT DOCUMENTS

| | | | | |
|---|---|---|---|---|
| 5,233,606 A | * | 8/1993 | Pashan et al. ............... | 370/418 |
| 6,088,335 A | * | 7/2000 | I et al. ............................ | 370/252 |
| 2003/0218608 A1 | * | 11/2003 | Chin et al. .................... | 345/419 |
| 2003/0219037 A1 | * | 11/2003 | Toskala et al. ................ | 370/496 |
| 2004/0198369 A1 | | 10/2004 | Kwak et al. | |
| 2005/0030965 A1 | * | 2/2005 | Aoki et al. ..................... | 370/432 |
| 2005/0030967 A1 | * | 2/2005 | Ohmi et al. ................... | 370/445 |
| 2006/0230159 A1 | * | 10/2006 | Jones et al. ................... | 709/228 |
| 2006/0252447 A1 | * | 11/2006 | Muharemovic et al. ...... | 455/522 |
| 2011/0019548 A1 | * | 1/2011 | Ohno ............................ | 370/232 |

FOREIGN PATENT DOCUMENTS

WO  WO 2005/078967 A1  8/2005

OTHER PUBLICATIONS

Parkvall, S et al: "WCDMA Enhanced Uplink Priciples and Basic Operation". Vehicular Technology Conference, 2005. VTC 2005—Spring. 2005 IEEE 61$^{st}$, vol. 3, May 30-Jun. 1, 2005. pp. 1411-1415.
Helmersson, KW et al. System Performance of WCDMA Enhanced Uplink. Vehicular Technology Conference 2005. IEEE 61$^{st}$, vol. 3. May 30, 2005.

* cited by examiner

*Primary Examiner* — Omar Ghowrwal

(57) ABSTRACT

The present invention relates to a node and a method for allocation of transmission rates to a mobile terminal for sending packet data over an air interface in a radio telecommunications network by sending messages to the mobile terminal using at least a first radio channel. The invention comprises: providing at least a first grant queue for queuing messages to mobile terminals, the messages indicating allocated transmission rates to be sent over the at least first radio channel; receiving a rate request from a mobile terminal; allocating a transmission rate to the mobile terminal in dependence of the current air interface interference and the assigned transmission rates in the grant queue; and queuing a message, to be sent to the mobile terminal, indicating the allocated transmission rate in the grant queue.

14 Claims, 2 Drawing Sheets

METHOD AND DEVICE FOR ALLOCATION OF TRANSMISSION RATE IN A RADIO TELECOMMUNICATION NETWORK

TECHNICAL FIELD

The present invention generally relates to the field of telecommunications. More specifically, the present invention relates to resource handling in an air interface in a radio telecommunications network.

BACKGROUND

The present invention finds application particularly in third-generation networks of Wideband Code division Multiple Access (WCDMA) type. However, the techniques may be applicable also in connection with other types of radio networks, such as GSM, CDMA etc.

In radio telecommunications networks a base station or a node B as it is named in WCDMA provides a radio, or air interface to a mobile user terminal, or user equipment. This radio interface is called the Uu interface in WCDMA. The node B is connected to a Radio Network Controller (RNC) which is the network element responsible for control of radio resources in the Universal Mobile Telephony Network (UMTS) Radio Access Network (UTRAN). The Node B and the RNC are connected through the Iub interface. The RNC is in turn connected to a Core Network (CN) which may comprise a number of different network nodes, such as MSC/VLR, SGSN etc.

In third-generation radio access networks increased transmission rates has been a primary goal and new protocols and techniques for achieving increased transmission rates has been developed. A High Speed Downlink Packet Access (HSDPA) protocol has been standardized in WCDMA release 5, and recently it has been complemented by a High Speed Uplink Packet Access (HSUPA) protocol in WCDMA release 6.

In HSUPA different user equipment is assigned different transmission rates, or Grants, ranging from 0 kbps up to 5.76 Mbps. That is, one user may have a larger Grant than another. To support the transmissions, hardware in Node B is allocated in hardware pools and hardware resources are allocated to a particular user to support the transmission rate required. The larger the transmission rates, the more hardware resources required, as well as air interference generated in the Uu interface, and load on the Iub link.

The serving node can, by sending absolute grants (AG) over an enhanced uplink grant channel (E_AGCH) adjust the scheduled transmission rate for the user equipment. One or several E_AGCH may be configured for each cell by the operator. The scheduling of transmission rate are performed in a fast manner to optimize the utilization of the air interface, and to grant users currently needing transmission resources the correct available resources, while at the same time not discriminating other users.

Thus, handling of received rate requests and the corresponding scheduling of resources becomes an important issue to optimize the utilization of the air interface.

SUMMARY

One object according to one aspect of the present invention is to at least alleviate problems mentioned above.

One object of one aspect according to the present invention is to provide a method and a network node for a more efficient allocation of air resources in a radio telecommunications network.

These objects, amongst others, are achieved, according to one aspect of the present invention, by a method for allocation of transmission rates to a mobile terminal for sending packet data over an air interface in a radio telecommunications network by sending messages to the mobile terminal using at least a first radio channel.

The method comprises the steps of: providing at least a first grant queue for queuing messages to mobile terminals, the messages indicating allocated transmission rates to be sent over the at least first radio channel; receiving a rate request from a mobile terminal; allocating a transmission rate to the mobile terminal in dependence of the current air interface interference and the assigned transmission rates in the grant queue; and queuing a message, to be sent to the mobile terminal, indicating the allocated transmission rate in the grant queue.

These objects, amongst others, are achieved, according to one aspect of the present invention, by a network node providing an air interface to a mobile terminal in a radio telecommunications network, the network node is provided to allocate transmission rates for sending packet data over the air interface by sending messages to the mobile terminal using at least a first radio channel.

The network node comprises at least a first grant queue provided to queue messages to mobile terminals, the messages indicating allocated transmission rates to be sent over the at least first radio channel; and the network node is provided to allocate transmission rates to mobile terminals in dependence of the current air interface interference and the assigned transmission rates in the grant queue; and to queue messages, to be sent to the mobile terminals, indicating the allocated transmission rate in the grant queue.

By allocating transmission rates to mobile terminals when a rate request is received and then queue the message to the mobile terminal it is possible to treat batches of received rate requests even if the channel used to send the allocated rates to the mobile terminals is congested.

Assuming it is only possible to send one transmission rate allocation every 10 ms over the radio channel, considerable more rate requests may be received, than rate allocations that can be sent during a specific time interval. By performing the allocation when the rate request is received and base the allocated transmission rate on the current interference in the cell, as well as the allocations currently in the queue a fair scheduling is achieved.

According to one aspect of the present invention a plurality of radio channels is provided for sending messages indicating allocated transmission rates to requesting mobile terminals, one grant queue for each of the radio channels is provided, and new messages, indicating allocated transmission rates, are queued in the grant queues in a round-robin fashion.

If several radio channels are provided for sending grant to the mobile terminals, a mechanism need to be provided for utilising the channels as efficient as possible. By providing a queue for each radio channel and queuing messages in a round-robin fashion an even distribution of the load on each channel is achieved.

According to one aspect of the present invention a plurality of radio channels for sending messages indicating allocated transmission rates to requesting mobile terminals is provided as well as one grant queue for each of the radio channels. Further more, one radio channel from the plurality of radio channels is allocated to a mobile terminal at call-set up in a round-robin fashion, and messages, indicating transmission rates, to be sent to the mobile terminal, are queued in the queue provided for the specific radio channel.

Alternatively, each mobile terminal in the cell can be assigned a specific radio channel if more than one is used. This particular channel is then used for sending messages changing the allocated transmission rate to that particular mobile terminal. By allocating one queue to each radio channel and assigning each mobile terminal to a specific radio channel, according to this aspect of the invention, as well as using this queue and radio channel for all further messages to the mobile terminal the radio resources can be optimally used.

According to one aspect of the present invention a maximum queue length for the grant queue is provided, and rate requests received from mobile terminals are discarded if the number of messages in the queue is equal to the maximum queue length.

By providing a maximum queue length it is possible for the operator to optimize the maximum delay between receiving a rate request at the radio base station and receiving a scheduled rate allocation at the mobile terminal According to one aspect of the present invention the radio telecommunications network is a Universal Mobile Telecommunication System (UMTS) radio access network (UTRAN) and the radio channel is an Enhanced Absolute Grant Channel (EAGCH).

The present invention is particularly applicable in a UMTS Radio Access Network (UTRAN) and specifically for High Speed Packet Access (HSPA) User Equipment (UE). Even more specifically for the High Speed Uplink Packet Access (HSUPA).

Further characteristics of the invention and advantages thereof will be evident from the following detailed description of embodiments of the invention.

BRIEF DESCRIPTION OF THE DRAWINGS

The present invention will become more fully understood from the detailed description of embodiments of the present invention given herein below and the accompanying FIGS. 1 to 4, which are given by way of illustration only, and thus are not limitative of the present invention.

DETAILED DESCRIPTION

In the following description, for purposes of explanation and not limitation, specific details are set forth, such as particular techniques and applications in order to provide a thorough understanding of the present invention. However, it will be apparent to one skilled in the art that the present invention may be practiced in other embodiments that depart from these specific details. In other instances, detailed descriptions of well-known methods and apparatuses are omitted so as not to obscure the description of the present invention with unnecessary details.

Figure 1:
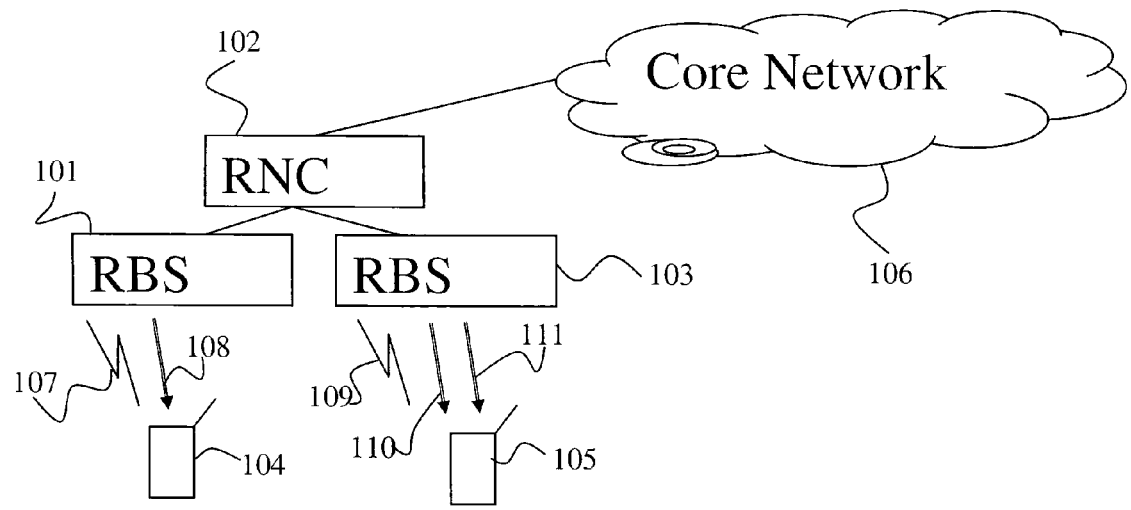
FIG. 1 is a schematic block diagram according to one aspect of the present invention.

FIG. 1 is a schematic block diagram of a radio access network according to one aspect of the present invention. A first radio base station (RBS) 101 is connected to a radio network controller (RNC) 102, having also a second RBS 103 connected. The RNC 102 is further more connected to a core network (CN) 106. The core network comprises a multitude of network nodes for supporting circuit switched, e.g. a Mobile Switching Center (MSC) as well as packet switched connections, e.g. a Serving GPRS Support Node (SGSN). The core network is further connected to other networks, such as the Internet, Public Land Mobile Networks (PLMN) etc.

A first User Equipment (UE) 104 has a packet data connection to the first RBS 101 as is indicated by the flash arrow 107.

In recent evolution of the uplink in CDMA systems such as the enhanced WCDMA uplink a fast scheduling functionality is introduced in the base station to improve resource management. Fast scheduling denotes the possibility for the base station to control when a mobile terminal is allowed transmit and at what rate. This enables fast reaction to the users momentary traffic demand and overload situations. Provided suitable estimates of the cell load, the system can be operated close to the maximum load limit providing improved user data rates as well as improved uplink capacity. To support the fast scheduling an Enhanced Absolute Grant Channel (E-AGCH) 108 is allocated to send absolute grant messages to the first UE 104, as will be disclosed in greater detail below.

Similarly, a second UE (105) has a packet data connection to the second RBS 103 as is illustrated by flash arrow 109. As can be seen in FIG. 1 the second RBS 103 has two E-AGCHs allocated 110 and 111 for scheduling absolute grants to users located in the particular cell.

Figure 2:
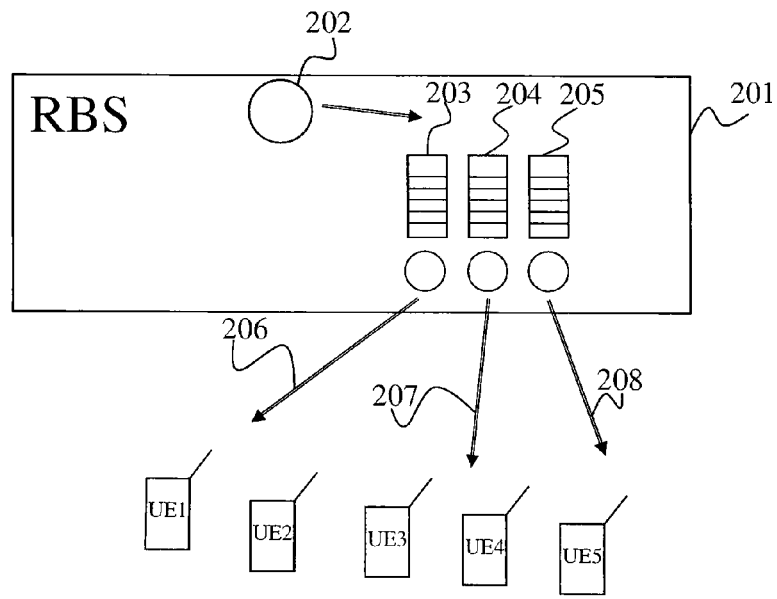
FIG. 2 is a schematic block diagram disclosing an radio base station in FIG. 1 in greater detail.

FIG. 2 is a block diagram of a radio base station 201 according to one aspect of the present invention in greater detail. First to fifth user equipment, UE1 to UE5, are sending rate requests to the RBS 201, to either set up an E-DCH connection, or to increase the previously allocated transmission rate. The rate requests are received at the RBS 201 and a scheduler 202, schematically indicated as a circle in FIG. 2, treats each rate request.

The scheduler 202 receives information from measurement equipment (not shown) about the current interference situation in the current cell, about the hardware availability situation, as well as the capacity situation for the link to the RNC. The scheduler 202 may thus draw conclusions regarding the general current capacity situation, and use this information to assign a specific transmission rate for the user equipment having sent the rate request currently treated.

The RBS 202 further comprises first, second and third grant message queues, 203, 204 and 205, respectively. The grant message queues are provided to queue absolute grant message to be sent on first, second and third E-AGCH 206, 207, 208, respectively.

Consequently, the first, second and third grant message queues may comprise absolute grant messages to be sent to user equipments, thus allocating transmission rates to be used soon. Thus, the scheduler 202 also keeps track of the allocated rates currently buffered when taking decisions about how large rate may be allocated to the currently treated rate request.

Each user equipment UE1 to UE5 is assigned a specific E-AGCH at call set-up, and all absolute grant messages from the particular UE will be queued in the queue corresponding to the assigned E-AGCH. For example, assume that UE1 and UE4 are assigned to the first E-AGCH 206 and UE2 and UE5 are assigned to the second E-AGCH 207. Then, if UE1 sends a rate request, the scheduler 202 will allocate a transmission rate to the UE1, according to what has been disclosed above, and an absolute grant message will be placed in the first queue, to be sent on the first E-AGCH in turn. The same is true for all absolute grant messages to UE4, while messages to UE2 and UE5 will be queued in the second queue and sent on the second E-AGCH.

The user equipments are assigned to the respective E-ACGH and corresponding queues in a round-robin fashion. That is, the first UE having a call set-up, that is UE1, is assigned the first E-AGCH, the second UE, that is UE2, is assigned the second E-AGCH and the third UE is assigned the third E-AGCH. Now, each E-AGCH has been assigned to one UE, and thus the next UE, that is UE4, is again assigned to the first E-AGCH, and the fifth UE, that is UE5, is assigned the second E-AGCH and so on. By this arrangement the load on the different E-AGCH is spread evenly.

Figure 3:
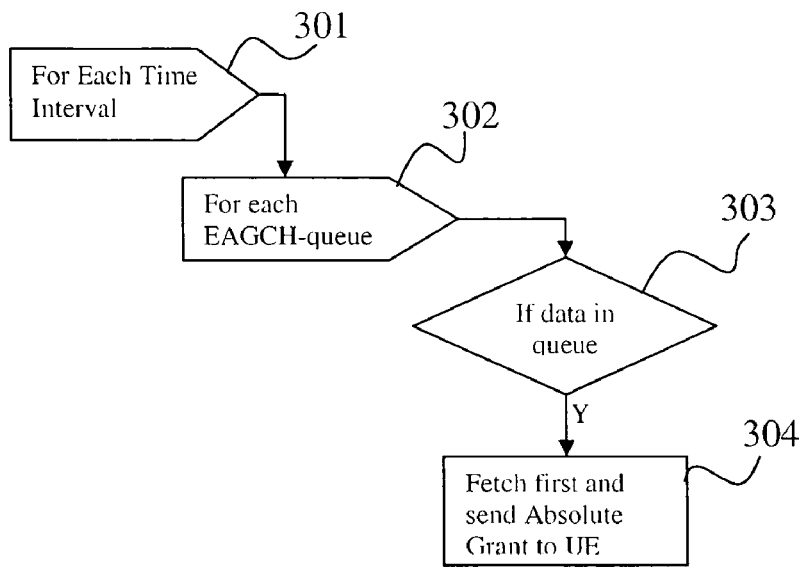
FIG. 3 is a schematic flow diagram according to one aspect of the present invention.

FIG. 3 is a schematic flow diagram according to one aspect of the present invention illustrating the process of sending absolute grant messages. Since it is only possible to send one absolute grant in each Transmission Time Interval (TTI) each grant queue 302 is checked each time interval 301. In data is present in the checked queue 303 the first message in the queue is fetched and transmitted on the particular E-AGCH channel 304.

Figure 4:
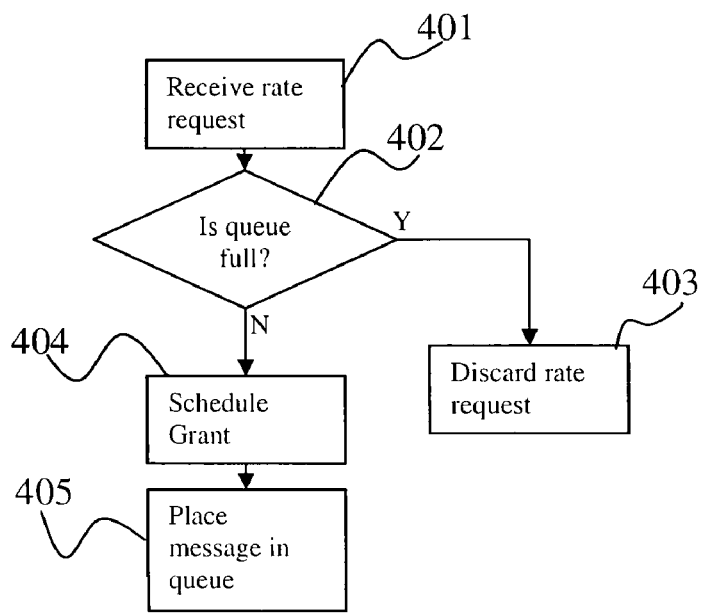
FIG. 4 is a schematic flow diagram according to one aspect of the present invention.

FIG. 4 is a schematic flow diagram according to one aspect of the present invention illustrating the process of scheduling new grants. When a rate request is received 401 from a UE a check is performed 402 to verify if the queue to be used for the UE is full. If the queue is full the rate request is discarded 403.

If room is available in the queue the scheduler 202 allocates a transmission rate 404 for the UE, taking in consideration the air interface interference, if it is possible to allocate the required hardware for demodulation and decoding, if the available capacity on the link between the RBS and the RNC is enough to support the data expected from the UE. All of this also in consideration of the allocation currently in all the absolute grant buffers, but not yet sent to the UE. More over, the scheduler might also consider absolute grants already sent to user equipments, but where it can be assumed that the UE has not yet adapted its transmission rate.

When the scheduler 202 has allocated the rate, the message to the UE is placed in the absolute grant queue corresponding to the E-AGCH used for the particular UE.

Thus, a fair scheduling of transmission rates can be achieved which is not limited to the particular time intervals where a E-AGCH message can be sent.

It will be obvious that the invention may be varied in a plurality of ways. Such variations are not to be regarded as a departure from the scope of the invention. All such modifications as would be obvious to one skilled in the art are intended to be included within the scope of the appended claims.

The invention claimed is:

1. A method implemented in a network node for allocating transmission rates to a mobile terminal where the mobile terminal uses the allocated transmission rates for sending packet data over an air interface in a radio telecommunications network, the method comprising steps of:

providing a first grant message queue for queuing grant messages to be sent to the mobile terminal, wherein said grant messages which indicate allocated transmission rates are to be sent over a first radio channel to the mobile terminal where the mobile terminal uses the allocated transmission rates for sending packet data over the air interface in the radio telecommunication network;

receiving a rate request from the mobile terminal;

allocating a transmission rate to said mobile terminal in response to the rate request in dependence of a current air interface interference and said allocated transmission rates in queued grant messages currently in said first grant message queue; and queuing a new grant message, to be sent to said mobile terminal, within said first grant message queue, where the new grant message indicates said allocated transmission rate in response to the rate request.

2. The method according to claim 1, comprising steps of:

providing a plurality of radio channels for sending grant messages indicating allocated transmission rates to requesting mobile terminals, providing one grant message queue for each of said radio channels, and queuing new grant messages and indicating allocated transmission rates in said grant message queues in a round-robin fashion.

3. The method according to claim 1, comprising steps of:

providing a plurality of radio channels for sending grant messages indicating allocated transmission rates to requesting mobile terminals, providing one grant message queue for each of said radio channels, assigning one radio channel from said plurality of radio channels to a mobile terminal at call-set up in a round-robin fashion, and queuing grant messages, indicating transmission rates, to be sent to said mobile terminal, in the one grant message queue provided for said one radio channel assigned to said mobile terminal.

4. The method according to claim 1, comprising steps of:

providing a maximum queue length for said first grant message queue, and discarding rate requests received from mobile terminals if a number of grant messages in said first grant message queue is equal to said maximum queue length.

5. The method according to claim 1, wherein said radio telecommunications network is a Universal Mobile Telephony Network (UMTS) radio network and said radio channel is an Enhanced Uplink Grant Channel (EAGCH).

6. The method according to claim 1, further comprising a step of sending the queued grant messages in predetermined time intervals to the mobile terminal using the first radio channel.

7. The method according to claim 6, wherein the allocating step further comprises in response to the rate request allocating the transmission rate to said mobile terminal in dependence of (1) the current air interface interference, (2) the allocated transmission rates in the queued grant messages in said first grant message queue, (3) if it is possible to allocate required hardware for demodulation and decoding, (4) if available capacity on a link between the network node and a radio network controller is enough to support the packet data from the mobile terminal, and (5) the queued grant messages already sent to the mobile terminal but where it can be assumed that the mobile terminal has not yet adapted the allocated transmission rates.

8. A network node providing an air interface in a radio telecommunications network to a mobile terminal, the network node provided to allocate transmission rates to a mobile terminal where the mobile terminal uses the allocated transmission rates for sending packet data over said air interface in the radio telecommunications network, comprising:

a first grant message queue provided to queue grant messages to be sent to the mobile terminal, wherein said grant messages which indicate allocated transmission rates are to be sent over a first radio channel to the mobile terminal where the mobile terminal uses the allocated transmission rates for sending packet data over the air interface in the radio telecommunication network, and said network node for:

receiving a rate request from the mobile terminal, allocating a transmission rate to the mobile terminal in response to the rate request in dependence of a current air interface interference and said allocated transmission rates in queued grant messages currently in said first grant message queue, and queuing a new grant message, to be sent to said mobile terminal, within said first grant message queue, where the new grant message indicates said allocated transmission rate in response to the rate request.

9. The network node according to claim 8, comprising a plurality of radio channels for sending grant messages indicating allocated transmission rates to requesting mobile terminals, and a grant message queue for each of said radio channels, wherein said network node is provided to queue new grant messages, indicating allocated transmission rates, in said grant message queues in a round-robin fashion.

10. The network node according to claim 8, further comprising a plurality of radio channels for sending grant messages indicating allocated transmission rates to requesting mobile terminals, a grant message queue for each of said radio channels, wherein said network node is provided to:

assign one radio channel from said plurality of radio channels to a mobile terminal at call-set up in a round-robin fashion, and queue new grant messages, indicating transmission rates, to be sent to said mobile terminal, in the one grant message queue provided for said one radio channel assigned to said mobile terminal.

11. The network node according to claim 8, further comprising a maximum queue length for said first grant message queue, wherein said network node is provided to discard rate grant requests received from mobile terminals if a number of grant messages in said first grant message queue is equal to said maximum queue length.

12. The network node according to claim 8, wherein said radio telecommunications network is a Universal Mobile Telephony Network (UMTS) radio network and said radio channel is an Enhanced Uplink Grant Channel (EAGCH).

13. The network node according to claim 8, wherein said network node is further arranged to send the queued grant messages in predetermined time intervals to the mobile terminal using the first radio channel.

14. The network node according to claim 13, wherein said network node further arranged in response to the rate request to allocate the transmission rate to said mobile terminal in dependence of (1) the current air interface interference, (2) the allocated transmission rates in the queued grant messages in said first grant message queue, (3) if it is possible to allocate required hardware for demodulation and decoding, (4) if available capacity on a link between the network node and a radio network controller is enough to support the packet data from the mobile terminal, and (5) the queued grant messages already sent to the mobile terminal but where it can be assumed that the mobile terminal has not yet adapted the allocated transmission rates.

\* \* \* \* \*